(12) United States Patent
Dierberger

(10) Patent No.: US 8,997,495 B2
(45) Date of Patent: Apr. 7, 2015

(54) STRAIN TOLERANT COMBUSTOR PANEL FOR GAS TURBINE ENGINE

(75) Inventor: James A. Dierberger, Hebron, CT (US)

(73) Assignee: United Technologies Corporation, Hartford, CT (US)

(*) Notice: Subject to any disclaimer, the term of this patent is extended or adjusted under 35 U.S.C. 154(b) by 880 days.

(21) Appl. No.: 13/168,258

(22) Filed: Jun. 24, 2011

(65) Prior Publication Data

US 2012/0324894 A1 Dec. 27, 2012

(51) Int. Cl.
*F02C 1/00* (2006.01)
*F23R 3/00* (2006.01)

(52) U.S. Cl.
CPC ............... *F23R 3/002* (2013.01); *F23R 3/005* (2013.01); *F23R 2900/00018* (2013.01); *Y02T 50/675* (2013.01)

(58) Field of Classification Search
CPC ............ F23R 3/002; F23R 3/007; F23R 3/60; F23R 2900/00018; F23R 2900/03041; F23R 2900/03042; F23R 2900/03044; Y02T 50/675; F23M 5/02

USPC ....................................................... 60/752–760
See application file for complete search history.

(56) References Cited

U.S. PATENT DOCUMENTS

| | | | |
|---|---|---|---|
| 6,511,762 B1 * | 1/2003 | Lee et al. | 428/697 |
| 6,761,956 B2 | 7/2004 | Lee et al. | |
| 7,093,439 B2 | 8/2006 | Pacheco-Tougas et al. | |
| 7,186,091 B2 | 3/2007 | Lee et al. | |
| 7,263,772 B2 | 9/2007 | Prociw et al. | |
| 7,793,503 B2 | 9/2010 | Grote et al. | |
| 2009/0013695 A1 | 1/2009 | Dierberger et al. | |
| 2010/0077764 A1 * | 4/2010 | Dierberger | 60/754 |
| 2011/0185738 A1 * | 8/2011 | Bastnagel et al. | 60/754 |

* cited by examiner

*Primary Examiner* — William H Rodriguez
*Assistant Examiner* — Arun Goyal
(74) *Attorney, Agent, or Firm* — Carlson, Gaskey & Olds, P.C.

(57) ABSTRACT

A combustor component of a gas turbine engine includes a substrate with a cold side, a central core section and a hot side, the cold side and the hot side have a porosity different than the central core section.

5 Claims, 5 Drawing Sheets

STRAIN TOLERANT COMBUSTOR PANEL FOR GAS TURBINE ENGINE

BACKGROUND

The present disclosure relates to a gas turbine engine combustor, and more particularly to a liner panel therefor.

A gas turbine engine includes a compressor for compressing air which is mixed with a fuel and channeled to a combustor wherein the mixture is ignited within a combustion chamber to generate hot combustion core gases. At least some combustors include combustor liners to channel the combustion gases to a turbine which extracts energy from the combustion core gases to power the compressor, as well as produce useful work to propel an aircraft in flight or to power a load, such as an electrical generator.

Gas turbine combustors have evolved from full hoop structures to full hoop shells with attached liner panels that serve as heat shields. Liner panels may have low durability due to local hot spots that may cause high stress and cracking.

SUMMARY

A combustor component of a gas turbine engine according to an exemplary aspect of the present disclosure includes a substrate with a cold side, a central core section and a hot side, the cold side and the hot side have a porosity different than the central core section.

A combustor of a gas turbine engine according to an exemplary aspect of the present disclosure includes a substrate mounted to a support shell, the substrate defines a cold side, a central core section and a hot side, the cold side and the hot side have a porosity different than the central core section.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
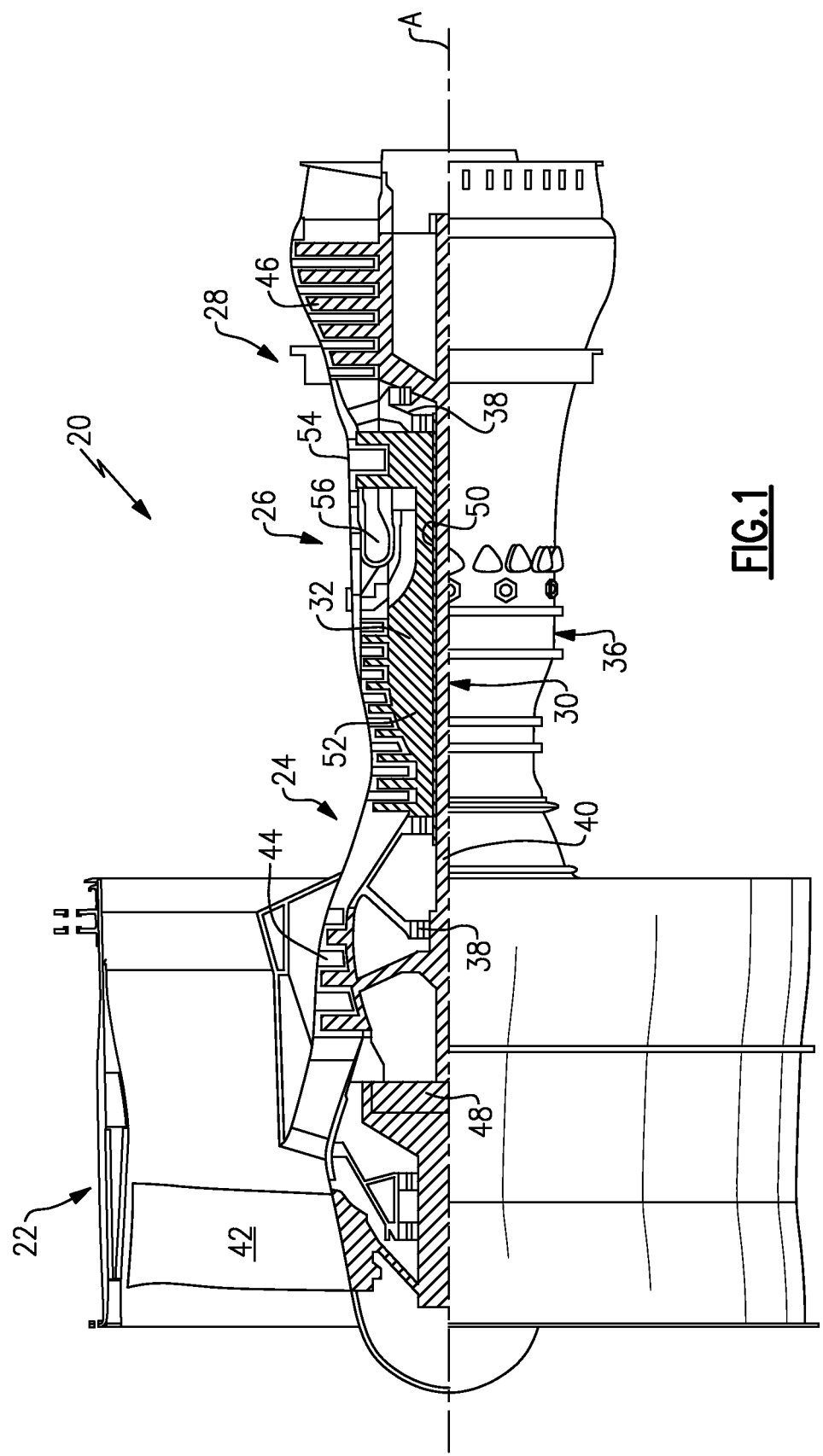
FIG. 1 is a schematic cross-section of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged between the high pressure compressor 52 and the high pressure turbine 54. The inner shaft 40 and the outer shaft 50 are concentric and rotate about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 54, 46 rotationally drive the respective low speed spool 30 and high speed spool 32 in response to the expansion.

Figure 2:
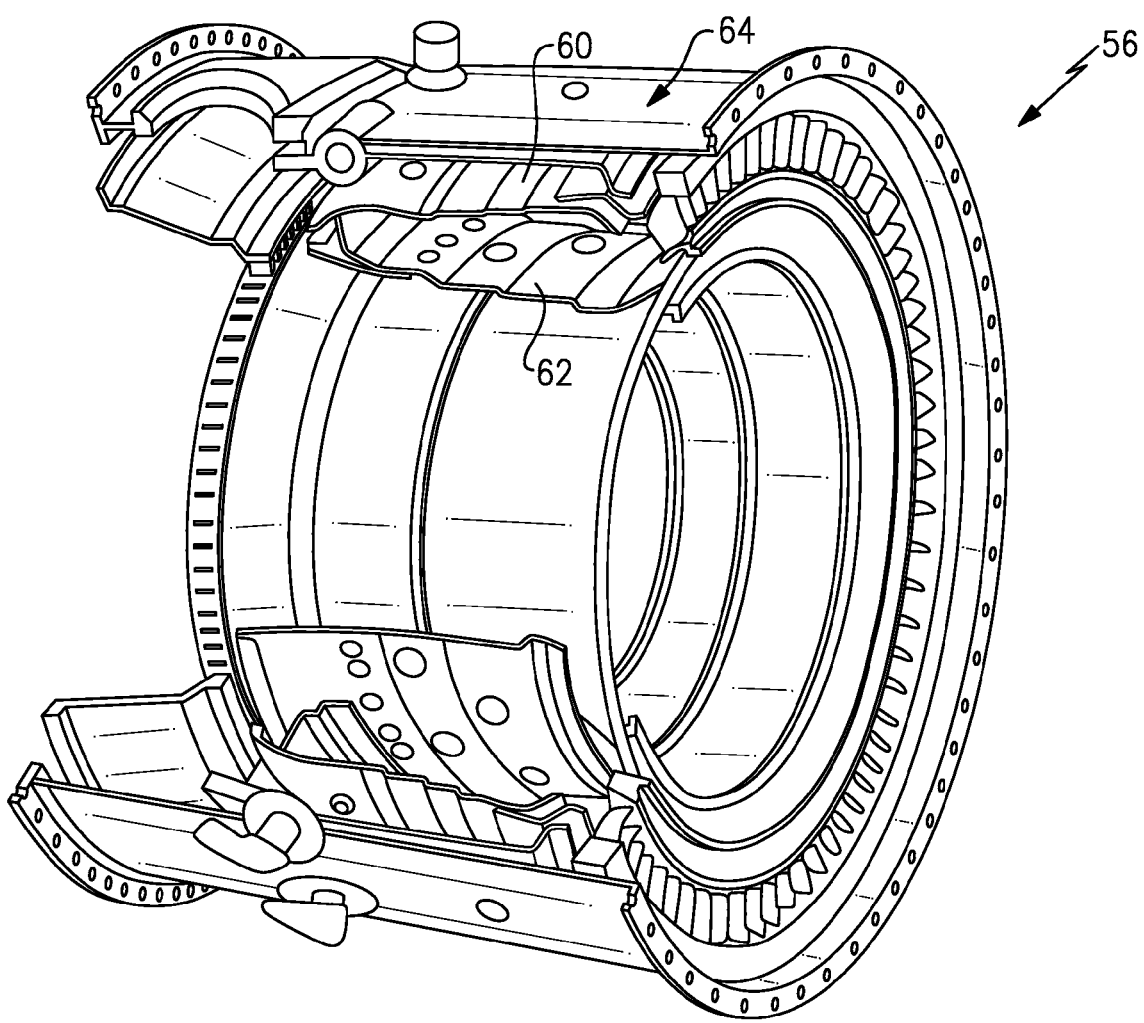
FIG. 2 is a perspective partial sectional view of an exemplary combustor that may be used with the gas turbine engine shown in FIG. 1.

With reference to FIG. 2, the combustor 56 generally includes an outer shell 60 and an inner shell 62 within a combustor case 64. It should be understood that various combustor arrangements may alternatively be provided and benefit herefrom.

Figure 3:
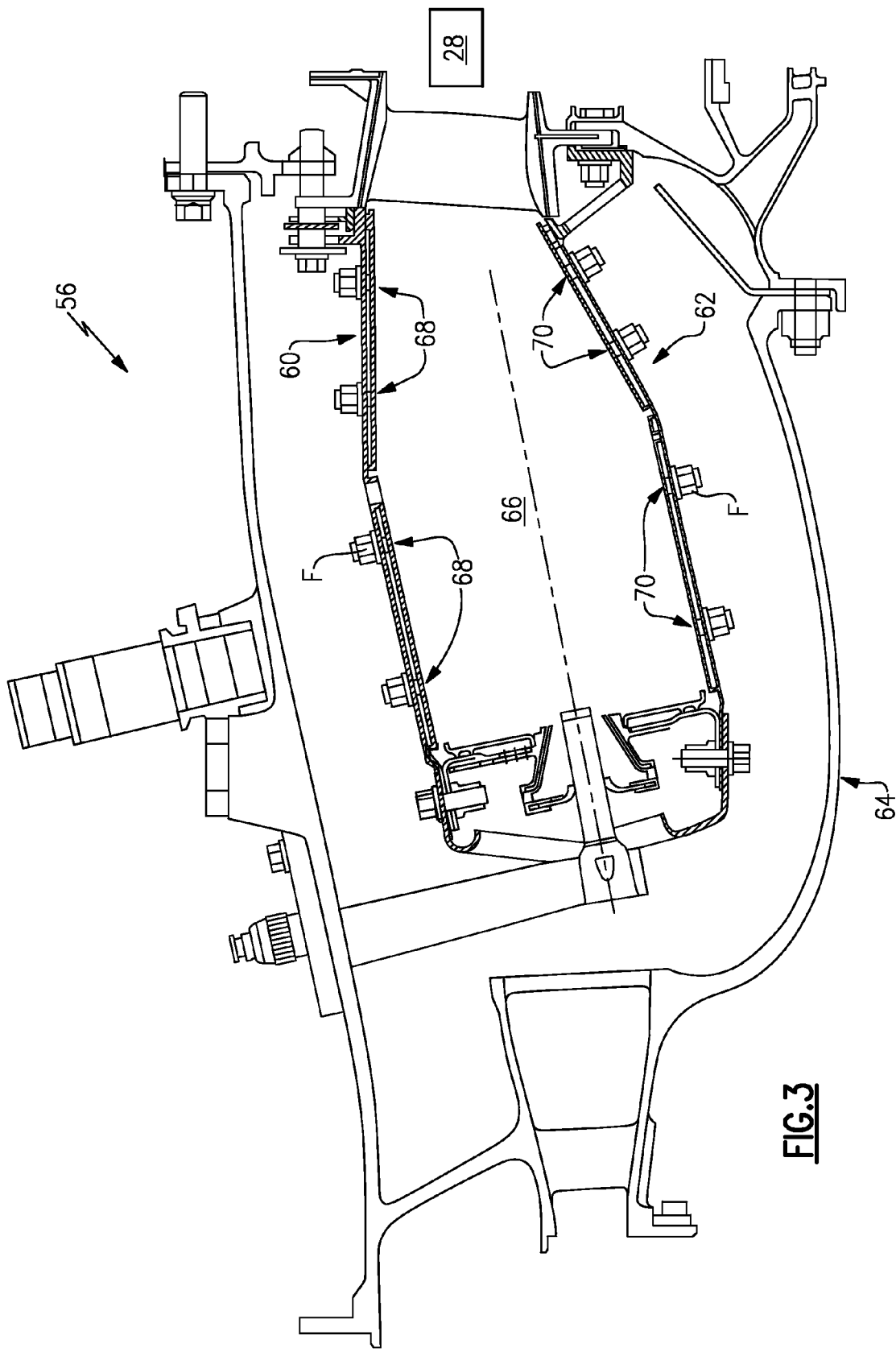
FIG. 3 is a cross-sectional view of an exemplary combustor that may be used with the gas turbine engine shown in FIG. 2.

With reference to FIG. 3, the outer shell 60 and the inner shell 62 define a combustion chamber 66 between shells 60, 62. Outer and inner shells 60, 62 extend toward the turbine section 28. A multiple of heat shield panels 68 line the hot side of the outer shell 60 and a multiple of heat shield panels 70 line the hot side of the inner shell 62. The heat shield panels may be manufactured of, for example, a nickel based super alloy or ceramic material. Fastener assemblies F such as studs and nuts may be used to connect each of the heat shield panels 68, 70 to the respective inner and outer shells 60, 62. The heat shield panels 68, 70 define an array which may be generally annular in shape and extend toward the turbine section 28.

Figure 4:
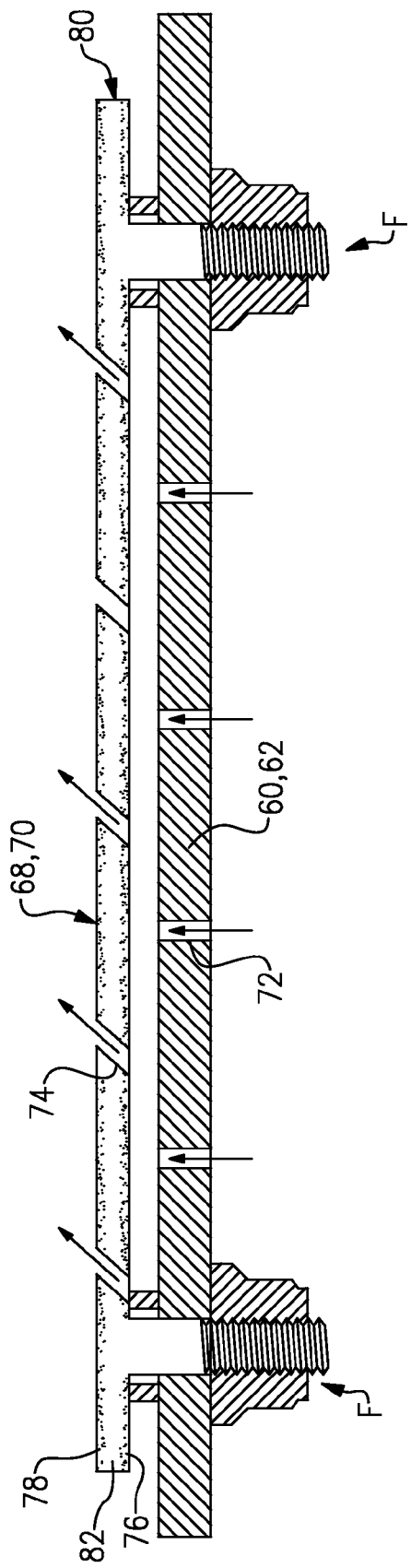
FIG. 4 is a sectional view of a heat shield floatwall panel combustor component.

With reference to FIG. 4, impingement cooling holes 72 penetrate through the inner and outer support shells 60, 62 to communicate coolant, such as secondary cooling air, into the space between the inner and outer support shells 60, 62 and the respective heat shield floatwall panels 68, 70. Film cooling holes 74 penetrate each of the heat shield floatwall panels 68, 70 to promote the formation of a film of cooling air.

Each heat shield floatwall panel 68, 70 is formed of a substrate 80 that defines a porosity tailored cold side 76 and a porosity tailored hot side 78 to increase durability through an increase strain tolerance. That is, the heat shield floatwall panels 68, 70 are made more durable by tailoring the cold side 76 and hot side 78 through an increase in porosity. The porosity reduces the structural stiffness such that the surfaces better absorb thermal strain, which lowers the stress and increases the durability.

In the disclosed, non-limiting embodiment, the cold side 76 and the hot side 78 have approximately 30% porosity while a central core section 82 is a 100% dense solid layer at the center on the neutral axis. The porosity is confined to the surfaces of the panel. For a panel thickness of approximately 0.04 inches (1.0 mm) each of the cold side 76 and the hot side 78 have approximately 30% porosity for a depth of approximately 0.016 inches (0.4 mm) while the central core section 82 with 100% density is approximately 0.008 inches (0.2 mm) thick. That is, the 100% density is generally equivalent to 0% porosity. The fastener assemblies F may be of full 100% density for integrity.

Figure 5:
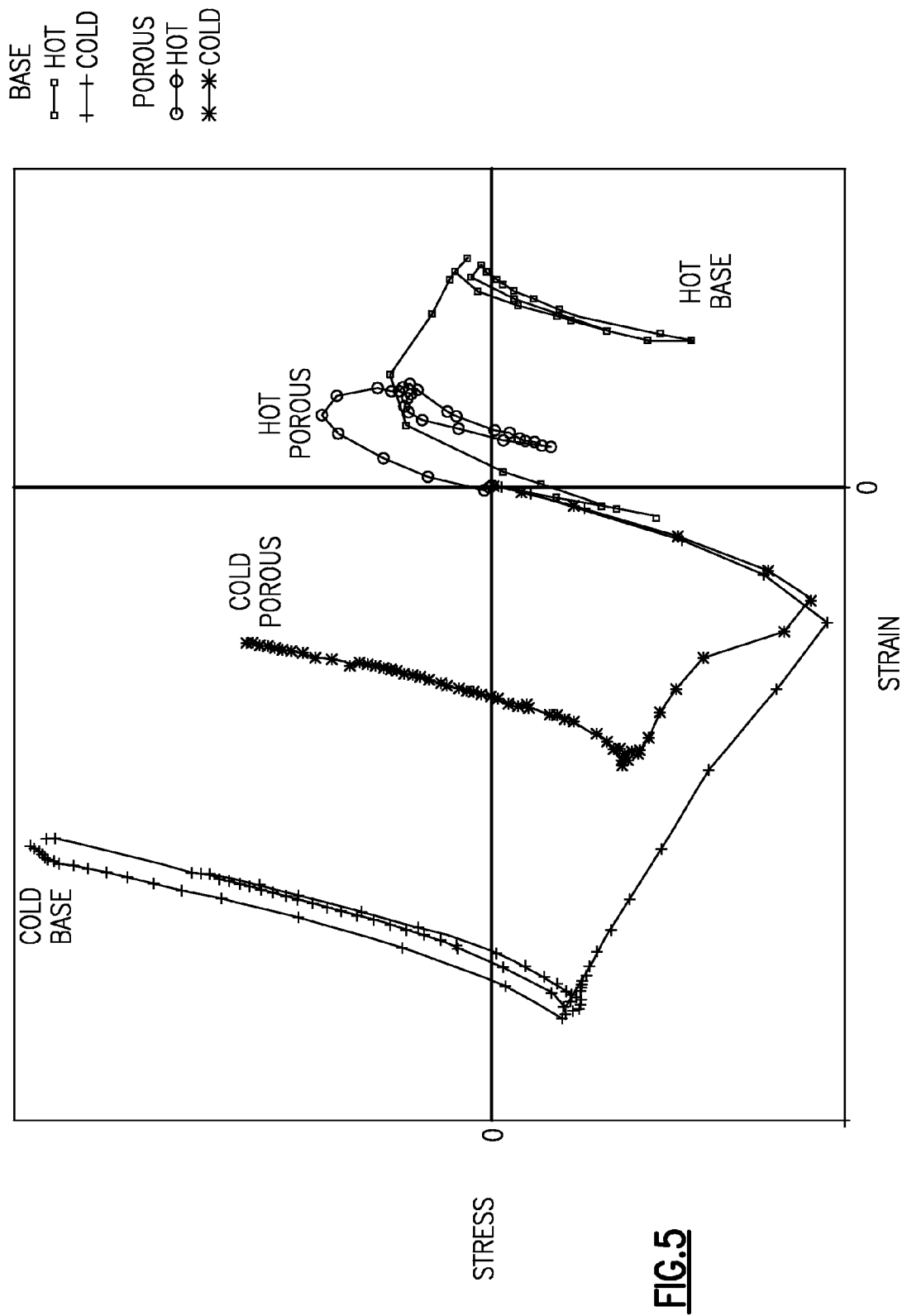
FIG. 5 is an analysis of two simulated thermal load cycles in which a hot spot was created at the center of the specimen. Structural analysis included plasticity and creep.

Finite element studies (FIG. 5) of such a panel show that a max stress range in a hot spot area is reduced approximately 30%. The 100% density of the central core section 82 of the substrate 80 operates as a flow barrier so that the impingement cooling holes 72 still provide metering of coolant in the system as well as minimizing the possibility of plugging which might otherwise occur if the pores were allowed to flow coolant. Initial studies are of an uncoated panel (i.e., no thermal barrier coating). For panels that are coated with a thermal barrier, there would be a similar benefit if porosity is used in the panel and in the thermal barrier with a region of zero porosity material (roughly) in between. It should be understood that the porosity in the thermal barrier, the cold side, and the hot side may be different.

The heat shield floatwall panels 68, 70 may be readily incorporated into existing combustors so that their cooling scheme is essentially unchanged. The porosity may be included in the casting which will minimize fabrication costs.

It should be understood that relative positional terms such as "forward," "aft," "upper," "lower," "above," "below," and the like are with reference to the normal operational attitude of the vehicle and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A combustor of a gas turbine engine comprising:
a support shell; and
a substrate mounted to said support shell such that there is a space between said substrate and said support shell, said substrate made from a material defining cold side surface, a hot side surface, and a central core section between said cold side surface and said hot side surface, said cold side surface and said hot side surface have a porosity different than said central core section, and said cold side surface is a free surface bounding said space, wherein
said cold side surface and said hot side surface have a porosity level of approximately 30%,
said central core section has a porosity level of approximately 0%,
said cold side surface and hot side surface porosity and said central core section porosity reduce structural stiffness such that surfaces of said hot side and said cold side better absorb thermal strain,
said cold side surface porosity is defined at said cold side surface,
said hot side surface porosity is defined at said hot side surface,
said support shell includes a plurality of impingement cooling holes,
said central core section defines a flow barrier between said cold side surface and said hot side surface to prevent the pores of said cold side surface from flowing coolant, and
said substrate is mounted to said support shell at a plurality of support points, wherein said substrate is spaced from said support shell at said plurality of support points.

2. The combustor as recited in claim 1, wherein said substrate includes a multiple of film cooling holes.

3. The combustor as recited in claim 2, wherein said support shell includes a multiple of impingement cooling holes, wherein said substrate is displaced from said support shell.

4. The combustor as recited in claim 1, wherein said cold side surface and said hot side surface have a porosity which defines a density less than said central core section.

5. The combustor as recited in claim 1, wherein said substrate does not have a thermal barrier coating.

* * * * *